United States Patent
Eberhardt

[19]

[11] Patent Number: 5,930,288
[45] Date of Patent: Jul. 27, 1999

[54] TIME-SHARED LOCK INDICATOR CIRCUIT AND METHOD FOR POWER CONTROL AND TRAFFIC CHANNEL DECODING IN A RADIO RECEIVER

[75] Inventor: Michael A. Eberhardt, Hanover Park, Ill.

[73] Assignee: Motorola, Inc., Schaumburg, Ill.

[21] Appl. No.: 08/770,468

[22] Filed: Dec. 20, 1996

Related U.S. Application Data

[63] Continuation-in-part of application No. 08/646,710, May 6, 1996, Pat. No. 5,754,583.

[51] Int. Cl.$^6$ ........................................................ H04B 1/69
[52] U.S. Cl. ............................................................. 375/200
[58] Field of Search .................................... 375/200, 205, 375/208, 317, 316; 370/209; 455/65, 506

[56] References Cited

U.S. PATENT DOCUMENTS 5,216,692  6/1993  Ling .
5,490,165  2/1996  Blakeney, II et al. .................. 375/205

FOREIGN PATENT DOCUMENTS 44 25 354 A1  2/1995  Germany ........................ H04B 7/216
2 291 567     1/1996  United Kingdom ........... H04B 1/707

*Primary Examiner*—Temesghen Ghebretinsae
*Attorney, Agent, or Firm*—John G. Rauch; Paul J. Bartusiak

[57] ABSTRACT

A communication device (100) includes a plurality of receiver fingers (112, 114, 116) for receiving a spread spectrum communication signal. Each receiver finger includes a received signal strength indication (RSSI) circuit (400). The RSSI circuit (400) includes an energy calculator (406) and a filter (410, 412) for producing a filtered signal which indicates signal quality. A first comparator (414) produces a primary lock indication when the filtered signal exceeds a primary lock threshold. A second comparator (418) produces a secondary lock indication when the filtered signal exceeds a secondary lock threshold. The bandwidth of the RSSI circuit (400) can be varied between a first bandwidth for providing the primary lock indication for traffic channel decoder and a second bandwidth for providing the secondary lock indication for the power control bit decoder. This allows performance to be tailored to the individual requirements of the traffic channel decoding and the power control channel decoding.

6 Claims, 3 Drawing Sheets

TIME-SHARED LOCK INDICATOR CIRCUIT AND METHOD FOR POWER CONTROL AND TRAFFIC CHANNEL DECODING IN A RADIO RECEIVER

CROSS-REFERENCE TO RELATED APPLICATIONS

This is a continuation in part of application Ser. No. 08/646,710, now U.S. Pat. No. 5,754,583 filed May 6, 1996, and entitled "Communication Device And Method For Determining Finger Lock Status In A Radio Receiver."

FIELD OF THE INVENTION

The present invention relates generally to spread spectrum radio communication. The present invention more particularly relates to a rake receiver apparatus and method for spread spectrum radio communication.

BACKGROUND OF THE INVENTION

Radio systems provide users of radio subscriber units with wireless communications. A particular type of radio system is a cellular radiotelephone system. A particular type of cellular radiotelephone system employs spread spectrum signalling. In such a system, a subscriber communication device such as a mobile station communicates with one or more remote base stations. Each base station provides communication in a fixed geographic area. As the mobile station moves among geographic areas, communication with the mobile station is handed off between the base stations.

Spread spectrum signalling can be broadly defined as a mechanism by which the bandwidth occupied by a transmitted signal is much greater than the bandwidth required by a baseband information signal. Two categories of spread spectrum communications are direct sequence spread spectrum (DSSS) and frequency-hopping spread spectrum (FHSS). The spectrum of a signal can be most easily spread by multiplying it with a wideband pseudorandom code-generated signal. It is essential that the spreading signal be precisely known so that the receiver can despread the signal. For DSSS, the objective of the receiver is to pick out the transmitted signal from a wide received bandwidth in which the signal is below the background noise level.

A cellular radiotelephone system using DSSS is commonly known as a Direct Sequence Code Division Multiple Access (DS-CDMA) system, according to Telecommunications Industry Association/Electronics Industries Association (TIA/EIA) interim standard IS-95. Individual users in the system use the same frequency but are separated by the use of individual spreading codes. Other spread spectrum systems include radiotelephone systems operating at 1900 MHz, as specified in American National Standards Institute (ANSI) standard J-STD-008. Other radio and radiotelephone systems use spread spectrum techniques as well.

In a spread spectrum communication system, downlink transmissions from a base station to a subscriber or mobile station include a pilot channel and a plurality of traffic channels. The pilot channel is decoded by all users. Each traffic channel is intended for decoding by a single user. Therefore, each traffic channel is encoded using a code known by both the base station and one mobile station. The pilot channel is encoded using a code known by the base station and all mobile stations.

In addition to the pilot channel and traffic channel signals, downlink transmissions also include a power control indicator in the traffic channel. The power control indicator is periodically transmitted by remote base stations to the mobile station to control the transmission power of the mobile station. The power control indicator conventionally includes several bits which are not encoded in any way. The power control indicator is binary in nature, in that it either tells the mobile station to increase transmit power or decrease transmit power. In response to the power control indicator, the mobile station adjusts its transmission power to accommodate changing channel conditions, such as fading or blocking or the sudden absence of these. For accurate, reliable communication, rapid response by the mobile station to the received power control indicator is necessary.

Mobile stations for use in spread spectrum communication systems commonly employ rake receivers. A rake receiver includes two or more receiver fingers which independently receive radio frequency (RF) signals. Each finger estimates channel gain and phase and demodulates the RF signals to produce traffic symbols. The traffic symbols of the receiver fingers are combined in a symbol combiner to produce a received signal.

Generally, the rake receiver fingers are assigned to the strongest channel multipath rays. That is, a first finger is assigned to receive the strongest signal, a second finger is assigned to receive the next strongest signal, and so on. As received signal strength changes, due to fading and other causes, the finger assignments are changed. Also, when the mobile is in a condition known as soft handoff, the fingers may be assigned to any of the base stations involved in the handoff. In soft handoff, the mobile station and base stations determine which base station provides optimum communication with the mobile station.

An average measure of multipath strength is employed to determine if a finger should be reassigned. The measure of multipath strength is the received signal-to-interference ratio (RSSI), also referred to as a received signal strength indication. The RSSI measurement is compared to predetermined lock and unlock thresholds. If the RSSI for a given finger is greater than the lock threshold, the finger is said to be locked. If the RSSI value is less than the unlock threshold, the finger is unlocked. The RSSI circuit provides a lock indication to a controller which controls the lock status of the individual fingers.

Good power control performance requires a fast RSSI circuit. The RSSI circuit should track Rayleigh fading and unlock a finger if a received signal momentarily drops into a fade. A weak link whose power control bits are demodulated incorrectly can cause the mobile station to respond incorrectly to the power control indication. This can cause dropped calls and other undesirable conditions. Thus, for power control bit decoding, it is necessary that the RSSI circuit be fast enough to unlock any finger that drops into a deep fade for longer than, for example, 10 ms.

However, the rapid response to fading required for power control bit decoding is not required for traffic channel demodulation. Accordingly, there is a need in the art for a rake receiver circuit and method in which a fast RSSI circuit provides a lock indication for power control bit decoding and a slow RSSI circuit provides a separate lock indication for traffic channel decoding. This would allow performance to be tailored to the individual requirements of the traffic channel decoding and the power control channel decoding. This, in turn, allows the performance to be optimized for accurate demodulation of both power control bits and traffic bits. The RSSI circuit is time-shared between the traffic channel and power control channel to minimize hardware requirements.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF THE PREFERRED EMBODIMENTS

Figure 1:
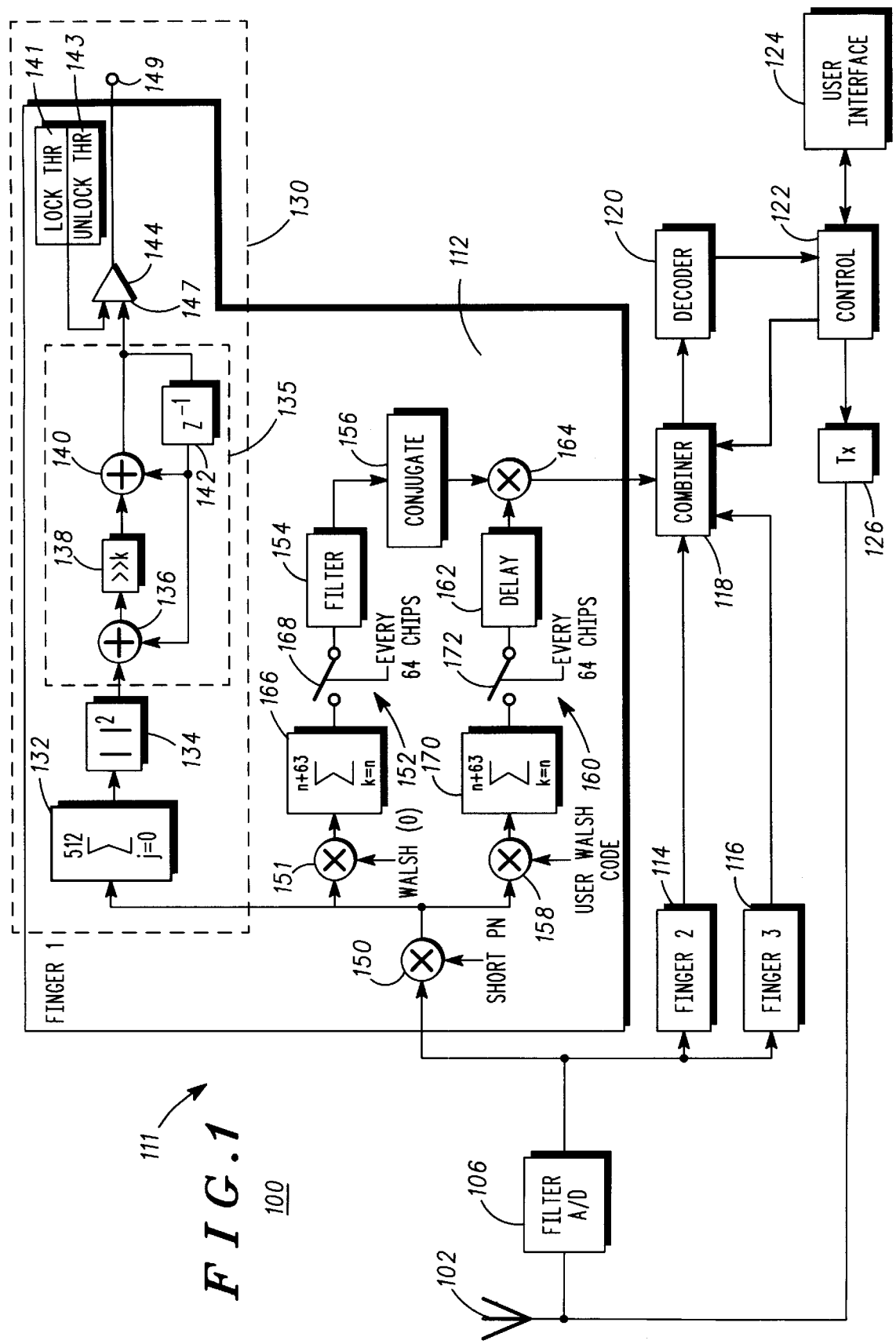
FIG. 1 is an operational block diagram of a radiotelephone mobile station.

Referring now to FIG. 1, it shows an operational block diagram of a communication device, mobile station 100. The mobile station 100 includes an antenna 102 and a filter circuit 106. The mobile station 100 further includes a receiver circuit 111 including a plurality of receiver fingers, including a first receiver finger 112, a second receiver finger 114, a third receiver finger 116, a combiner 118 coupled to each receiver finger, and a decoder 120. The mobile station 100 further includes a controller 122, a user interface 124 and a transmitter 126.

The mobile station 100 is preferably configured for use in a DS-CDMA cellular radiotelephone system including a plurality of remotely located base stations. Each base station includes a transceiver which sends and receives radio frequency (RF) signals to and from mobile stations, including mobile station 100, within a fixed geographic area. While this is one application for the mobile station 100, the mobile station 100 may be used in any suitable spread spectrum communication system.

In the mobile station 100, the antenna 102 sends and receives RF signals to and from a base station. RF signals received at the antenna 102 are filtered, converted from analog signals to digital data and otherwise processed in filter circuit 106. The filter circuit 106 may also perform other functions such as automatic gain control and down-conversion to intermediate frequency (IF) for processing.

The mobile station 100 employs a radio receiver which receives signals subject to fading. The receiver circuit 111 is a rake receiver including first receiver finger 112, second receiver finger 114 and third receiver finger 116 configured for receiving a spread spectrum communication signal over a communication channel. As will be described in further detail below, each receiver finger produces a traffic signal including traffic symbols. Each receiver finger further produces a lock indication indicative of a lock status of the receiver finger. The structure and operation of first receiver finger 112 will be discussed in greater detail below. Preferably, second receiver finger 114 and third receiver finger 116 operate substantially the same as first receiver finger 112.

As noted, the combiner 118 is coupled to the plurality of receiver fingers, first receiver finger 112, second receiver finger 114 and third receiver finger 116. The combiner 118 combines the traffic signal from each respective receiver finger in response to the lock indication from each respective receiver finger and forms a received signal. The combiner 118 provides the received signal to the decoder 120. The decoder 120 provides de-interleaving and channel decoding and may be a Viterbi decoder or another type of convolutional decoder or any other suitable decoder. The decoder 120 recovers the data transmitted on the RF signals and outputs the data to the controller 122.

The controller 122 formats the data into recognizable voice or information for use by user interface 124. The controller 122 is electrically coupled to other elements of the mobile station 100 for receiving control information and providing control signals. The control connections are not shown in FIG. 1 so as to not unduly complicate the drawing figure. The controller 122 typically includes a microprocessor and memory. The user interface 124 communicates the received information or voice to a user. Typically, the user interface 124 includes a display, a keypad, a speaker and a microphone.

The individual receiver fingers 112, 114, 116 are assigned to receive different signals. In multipath conditions, the receiver fingers 112, 114, 116 are assigned to receive individual multipath signals or rays. During soft handoff, the receiver fingers 112, 114, 116 are assigned to different base stations involved in the handoff. Assignment of the receiver fingers to respective signals is under control of the controller 122 in a manner to be described below.

Upon transmission of radio frequency signals from the mobile station 100 to a remote base station, the user interface 124 transmits user input data to the controller 122. The controller 122 formats the information obtained from the user interface 124 and conveys it to the transmitter 126 for conversion into RF modulated signals. The transmitter 126 conveys the RF modulated signals to the antenna 102 for transmission to the base station.

The structure and operation of each of the rake receiver fingers 112, 114, 116 for receiving and demodulating signals will now be discussed, using first receiver finger 112 as an example. In accordance with the present invention, the mobile station 100 is configured to receive one or more spread spectrum communication signals, preferably direct sequence code division multiple access (DS-CDMA) signals. Each of the spread spectrum communication signals includes a pilot channel and a plurality of traffic channels.

At a transmitter, such as at a base station in a cellular radiotelephone system, the pilot channel and traffic channels are encoded using Walsh codes. The pilot channel and traffic channels are encoded using a different Walsh code. Typically, the pilot channel is encoded using a Walsh(0) code, a first traffic channel is encoded using a Walsh(2) code, etc. After encoding, the signal spectrum is spread using a pseudorandom noise (PN) code. The spread spectrum signal in digital form comprises a series of chips whose respective values are defined by the PN code and the encoded data. The PN code for each base station is unique to that base station. Each receiver in the system, or subscriber in a cellular radiotelephone system, is assigned a unique Walsh code corresponding to the traffic channel on which it communicates with the base station for decoding the traffic channel. Each receiver also decodes the pilot channel. Each receiver knows the PN codes corresponding to base stations in the system. The pilot channel is used to estimate the channel phase and the channel gain of the communication channel.

To obtain the best received signal, the receiver circuit 111 including the receiver fingers 112, 114, 116 and the combiner 118 attempt to combine symbols from as many fingers as possible. Each finger is individually assigned to a received signal, such as an individual multipath signal or a signal from one of the base stations involved in a soft handoff. A signal quality parameter, such as RSSI, is measured to determine whether a finger should be combined by the combiner 118. If the signal quality exceeds a lock threshold, the finger is "locked." If the signal quality falls below an unlock threshold, the finger is "unlocked." This finger lock status is used by the rake receiver circuit 111 to determine whether or not the finger should be used by the combiner 118.

First receiver finger 112 includes a received signal strength indication (RSSI) circuit 130, a despreader 150, a pilot symbol decoder 151, a pilot channel summer 152, a filter 154, a conjugate generator 156, a traffic symbol decoder 158, a traffic channel summer 160, a delay element 162 and a demodulator 164. It will be recognized by those ordinarily skilled in the art that these elements may be implemented in hardware or in software, or in some combination of the two which enhances efficiency and manufacturability.

The despreader 150 receives from the filter circuit 106 a digital representation of the spread spectrum communication signal received by the mobile station 100. The despreader 150 applies a pseudorandom noise (PN) code to the received signal. The despreader 150 despreads the received signal, producing a despread signal. The PN code is stored at the mobile station 100 and may be transmitted to the mobile station 100, for example from a base station, when the communication channel between the base station and the mobile station 100 is initiated. The PN code is unique to the base station so that the mobile station may select a base station for communication by selecting the corresponding PN code.

The despread signal is provided from the despreader 150 to the pilot symbol decoder 151. The pilot symbol decoder 151 decodes the pilot channel signal and detects pilot symbols. The pilot symbol decoder applies a pilot channel code which is typically the Walsh code Walsh(0). The pilot symbol decoder 151 applies the decoded signal to the pilot channel summer 152. The pilot channel summer 152 includes a summer 166 and a switch 168. The summer 166 sums 64 consecutive chips to form a pilot symbol. After every sixty-fourth chip, the switch 168 closes to couple the summer 166 to the filter 154 to provide a received pilot symbol to the filter 154.

The embodiment shown in FIG. 1 is suitable if a Walsh code is used for encoding the pilot channel. Since Walsh(0) consists of all binary ones, no decoding is necessary when the pilot channel is encoded using Walsh(0) and the pilot symbol decoder 151 may be omitted. However, if another Walsh code or another type of coding is used to encode the pilot channel, a decoder is necessary. Such a decoder applies a pilot code to the despread signal to produce the pilot channel signal.

The filter 154 receives the pilot symbols from the pilot channel summer 152. The filter 154 filters the pilot channel signal to obtain a complex representation of an estimated channel gain and an estimated channel phase for the communication channel, in a manner to be described below.

The filter 154 is preferably a low pass filter. The input of the filter is the pilot symbols p(n). The output of the filter is the estimate ĥ(n) of the channel coefficient. ĥ(n) is a complex number containing both phase and magnitude information. The phase information corresponds to an estimate of channel phase. The magnitude information corresponds to an estimate of channel gain. One possible implementation of the filter 154 will be described below in conjunction with FIG. 2. The conjugate generator 156 determines the complex conjugate of the signal ĥ(n) produced by the filter 154. The filter 154, in conjunction with the conjugate generator 156, produces an estimate of the complex conjugate of the complex representation of channel gain and channel phase for the communication channel. The complex conjugate of the complex representation of the channel phase and the channel gain are provided to the demodulator 164.

The despread signal is also provided from the despreader 150 to the traffic symbol decoder 158. The traffic symbol decoder 158 produces a traffic signal in response to the spread spectrum communication signal received by the mobile station 100. The traffic symbol decoder 158 applies a user specific traffic code to the despread signal to produce the traffic channel signal. The user specific traffic code is the Walsh code Walsh(n) assigned to the mobile station 100. The traffic channel signal is provided to the traffic channel summer 160.

The traffic channel summer 160 includes a summer 170 and a switch 172. The summer 170 sums 64 consecutive chips to form a traffic symbol. After every sixty-fourth chip, the switch 172 closes to couple the summer 170 to the delay element 162 to provide a received traffic symbol to the delay element 162. Thus the traffic channel summer 160 detects the traffic channel.

The delay element 162 is preferably a FIFO, or first in, first out buffer. The filter 154 introduces a filter delay when estimating the channel gain and channel phase. The delay element 162 compensates for this filter delay to ensure that the estimated channel phase and estimated channel gain are used to demodulate the corresponding traffic symbols. The delay element 162 delays the spread spectrum communication signal a predetermined time to produce a delayed signal. More specifically, the delay element 162 delays only the traffic symbols of the traffic channel to produce the delayed traffic symbols.

The delayed traffic symbols are provided to the demodulator 164. The demodulator 164 may be implemented as a multiplier which multiplies the delayed traffic symbols and the signal received from the conjugate generator 156, demodulating the delayed traffic symbols using the estimated channel phase and estimated channel gain. The result of this multiplication is provided to the decoder 120 for further processing.

The RSSI circuit 130 includes a summer 132, energy calculator 134, a filter 135 including a summer 136, a shifter 138, a summer 140 and a delay element 142, a comparator 144 and memory 146. The RSSI circuit 130 is coupled to the pilot symbol decoder 151. The RSSI circuit 130 samples the pilot symbols and produces a pilot sample signal. The filter 135 filters the pilot sample signal and produces a filtered signal. The comparator 144 produces a lock indication at an output 149 when the filtered signal exceeds a lock threshold.

The summer 132 is coupled to the pilot symbol decoder 151 and receives a signal in the form of chips. The summer 132 sums 512 consecutive chips to form a pilot symbol. The energy calculator 134 determines energy in the pilot signal and provides a signal to the filter 135. The filter 135 averages the signal over an averaging time period, producing a filtered signal. The signal has an assumed average fade interval. The assumed average fade interval corresponds to an assumed average fade interval of the spread spectrum communication signal received by the mobile station 100. The assumed average fade interval varies with operational conditions of the mobile station 100, such as multipath environment and speed of travel of the mobile station 100. The averaging time period is preferably longer than the assumed average fade interval of the signal.

The shifter 138 shifts the signal to the right a predetermined number k of bit positions. In the preferred embodiment k=6. However, k may be any suitable value. Varying the value of k has the effect of varying the bandwidth of the filter 135. The spread spectrum signal received by the mobile station typically is subject to fading and the filter 135 has a variable bandwidth for filtering the effects of fading. In accordance with the present invention, the bandwidth of the filter 135 is reduced to filter the effects of fading. Expressed alternatively, the filter 135 averages the signal over an averaging time period. Increasing the value of k increases the averaging time period over which the received signal is averaged. Preferably, the averaging time period is established in the range from 10 to 200 milliseconds (ms). In one embodiment, the averaging time period is established at substantially 30 ms.

The comparator 144 has a first input 147 coupled to the filter for receiving the filtered signal. The comparator 144 has a second input 145 coupled to the memory 146. The comparator 144 compares the filtered signal to a lock threshold 141 or an unlock threshold 143 stored in the memory 146. The filtered signal corresponds to a signal quality parameter, such as an RSSI measurement. The comparator produces a lock indication at the output 149 in response to the comparison.

The lock indication is provided to the controller 122. When the lock indication indicates that the RSSI measurement exceeds the lock threshold and the first receiver finger 112 should be locked, the first receiver finger 112 is locked by the controller 122, and the traffic signal or traffic symbols from the first receiver finger 112 are combined by the combiner 118. The combiner does not combine the traffic signal from the receiver finger when the filtered signal falls below an unlock threshold after a previous lock indication. Thus, the receiver circuit 111 locks the first receiver finger 112 when a signal quality parameter for the filtered signal exceeds a lock threshold and unlocks the first receiver finger 112 when the signal quality parameter falls below the unlock threshold. The lock threshold may be different from the unlock threshold. Alternatively, the lock threshold may be substantially equal to the unlock threshold.

The unlock threshold is set slightly above the noise floor of the first receiver finger 112. The noise floor corresponds to the minimum input signal level required to discriminate the input signal from noise. In an exemplary embodiment, the noise floor of the first receiver finger 112 is substantially −27 dB $E_c/I_0$ where $E_c$ is the total chip energy and $I_0$, is the total interference including noise. Preferably, the unlock threshold is established in the range of −19 to −27 dB $E_c/I_0$. The inventors have determined that excellent results are obtained by establishing the unlock threshold at substantially −24 dB $E_c/I_0$.

In conventional receiver circuits, the unlock threshold is established at approximately −18.5 dB $E_c/I_0$. This value provides time for determination of an accurate channel estimate to use for combining. Also, this value accommodates channel estimators which are inaccurate at low received signal strengths. With this unlock threshold, receiver finger 112 can unlock during a deep fade. With any of the receiver fingers 112, 114, 116 unlocked during a fade, the multipath ray is unusable and some useful pilot signal information from the spread spectrum communication signal is lost. The ray remains unusable until the finger's RSSI rises above the lock threshold. This can result in significant degradation in receiver performance in a two- or three-way soft handoff situation or any time the pilot signal is weak relative to the total power received from the corresponding base stations. The severity of the degradation increases during slow fading.

In a mobile station employing a receiver circuit according to the present invention, the likelihood of a finger unlocking during a fade is reduced. If a multipath ray is in fade, the ray can still provide some benefit with coherent combining. Lowering the unlock threshold, for example, into the range −19 to −27 dB $E_c/I_0$, limits unlocking of the receiver finger and improves performance of the receiver circuit 111. Additional enhancements to receiver performance are obtained by immediately obtaining a pilot estimate for immediate combining of the finger, as will be discussed below in conjunction with FIG. 3.

Figure 2:
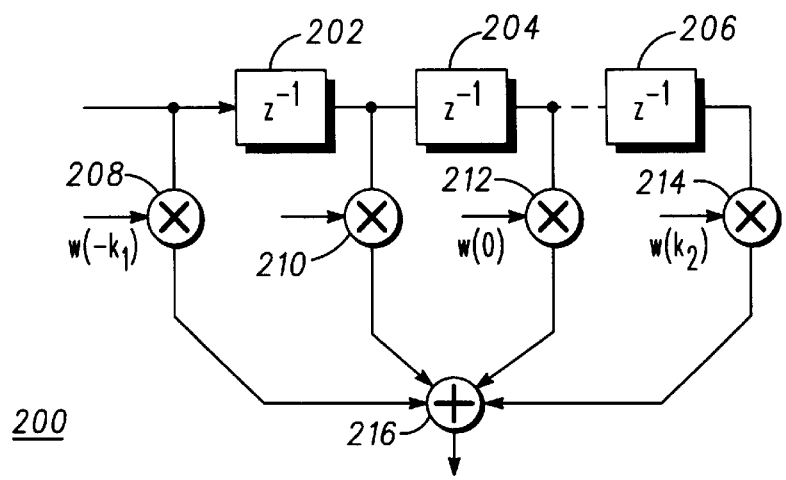
FIG. 2 is a block diagram of a first filter for use in the radiotelephone mobile station of FIG. 1.

Referring now to FIG. 2, it shows a block diagram of a finite impulse response (FIR) filter 200 for use in the radiotelephone mobile station 100 of FIG. 1. The filter 200 may be used for providing the low pass filtering function of the filter 154 in FIG. 1. The filter 200 includes delay elements 202, 204, 206, multipliers 208, 210, 212 and 214, and a summer 216.

Preferably, the filter 200 uses a total of 61 delay elements such as delay elements 202, 204, 206, not all of which are shown in FIG. 2 so as not to unduly complicate the drawing figure. The delay elements operate in sequential phases, shifting pilot symbols serially through the chain of delay elements. The delay elements are coupled in series so that, during a first phase, delay element 202 receives a first pilot symbol from the pilot channel summer 152 (FIG. 1). After a delay equal to one pilot symbol period, during a second phase, the first pilot symbol is conveyed from delay element 202 to delay element 204 and a second pilot symbol is conveyed from the pilot channel summer 152 to delay element 202. Again, after a delay equal to one pilot symbol period, during a third phase, the first pilot symbol is conveyed from delay element 204 to the next delay element series-coupled with delay element 204, the second pilot symbol is conveyed from delay element 202 to delay element 204, and a third pilot symbol is conveyed from pilot channel summer 152 to delay element 202.

During each phase, the pilot symbols stored at each delay element are multiplied with a weighting coefficient by a respective multiplier 208, 210, 212, 214. Preferably the filter 200 uses a total of 62 multipliers such as multipliers 208, 210, 212 and 214, not all of which are shown in FIG. 2. Each multiplier corresponds to one of the delay elements 202, 204, 206. The multipliers multiply the delayed pilot symbol stored in the respective delay element by a weighting coefficient. Also, multiplier 208 multiplies the incoming pilot symbol, at the input of delay element 202, by a weighting coefficient.

The weighting coefficients may be estimated according to any appropriate method. In one simple example, all of the weighting coefficients may be set equal to unity. In such an implementation, the filter 200 is a low pass filter averaging a predetermined number (for example, 42) of pilot symbols without weighting. Preferably, the weighting coefficients are chosen so that the filter 200 has a frequency response close to an ideal rectangular frequency response of a low pass filter.

In an alternative embodiment, the filter 154 (FIG. 1) could be implemented using a low pass infinite impulse response (IIR) filter. Such an IIR filter should have a near-linear phase response within its passband.

The filter 154 is characterized by a group delay at the frequency of interest. For a linear phase FIR filter, such as the filter 200, the group delay of the filter is equal to one-half the delay or length of the filter. For a non-linear-phase FIR or for an IIR filter, the group delay is defined as $$\frac{d\phi(f)}{df}\bigg|_{f=f_n}$$

where $\phi$ is the phase rotation introduced by the filter at frequency f and $f_0$ is the frequency of interest. The delay introduced by the delay element 162 is substantially equal to the group delay of the filter 154.

Figure 3:
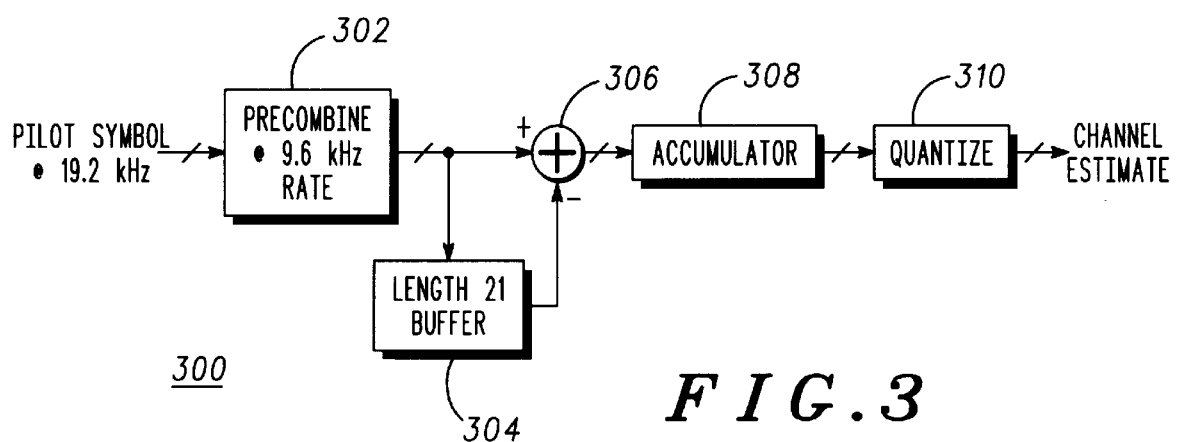
FIG. 3 is a block diagram of a second filter for use in the radiotelephone mobile station of FIG. 1.

FIG. 3 is a block diagram of a filter 300 for use in the radiotelephone mobile station of FIG. 1. The filter 300 includes a precombiner 302, a buffer 304, a summer 306, an accumulator 308, and a quantizer 310. The precombiner 302 is coupled to the pilot channel summer 152 (FIG. 1) and receives the despread pilot symbols at a predetermined rate, such as 19.2 KHz. The precombiner 302 combines subsequently received pilot symbols to form combined pilot symbols. This acts to reduce the memory requirements of the filter 300. For example, the precombiner may add two pilot symbols, designated p(n) and p(n+1) together to produce a combined pilot symbol, which is then stored. In applications where memory requirements are not a concern, the precombiner may be omitted.

The precombiner 302 shifts the combined pilot symbols sequentially into the buffer 304. The buffer preferably stores 21 combined pilot symbols, corresponding to 42 pilot symbols received from the pilot channel summer 152. This also corresponds to a group delay of 1.1 milliseconds.

During each combined pilot symbol period, the buffer 304 shifts a new combined pilot symbol into the buffer 304 and shifts the oldest combined pilot symbol out of the buffer 304. The summer 306 sums the contents of the buffer with the new combined pilot symbol provided by the precombiner 302 to the summer 306. The sum is accumulated in the accumulator 308. The sum is then quantized to reduce storage requirements in the quantizer 310. This quantized result corresponds to the estimate of the channel phase and channel gain.

As noted, the filter 300 is characterized by a group delay, preferably equal to 21 pilot symbols or 1.1 milliseconds. If the filter 300 is used to provide the filtering function of the filter 154 (FIG. 1), the delay introduced by the delay element 162 is substantially equal to the group delay of the filter 300.

In accordance with the present invention, the filter 300 may be used as an averaging circuit over T symbols for generating a pilot estimate to permit a receiver finger such as receiver finger 112 to be immediately combined when the finger is assigned to a new signal. When a finger is assigned to a new multipath ray, the finger must first obtain an estimate of the new pilot before it can be coherently combined. In conventional receiver circuits, a finger is assigned unlocked and will lock once the finger's RSSI rises above the RSSI lock threshold. The conventional channel estimator uses a phase locked loop (PLL) to generate a gain and phase estimate of the new pilot. The PLL needs time to lock onto the new pilot. This delay causes degradation each time a finger is reassigned. In many applications, fingers frequently need to be reassigned. For example, the multipath profile corresponding to a given base station is constantly changing. Also, as the mobile station 100 crosses cell boundaries, the base stations in soft handoff with the mobile station 100 change over time. In these situations, delay in combining a receiver finger, and the attendant degradation in receiver performance, is unacceptable.

In the filter 300, the accumulator 308 is an averaging circuit. After assigning the receiver finger 112 to a new signal, the receiver finger is immediately locked. In some implementations, the receiver circuit 111 may include a register or other memory element for storing a lock status of the receiver finger. Combining does not occur until the lock status is written as "locked" in the register. In such an implementation, the register may be written as "locked" and then the finger assigned to the new signal. The averaging circuit, accumulator 308, and the buffer 304 are also cleared or reset and the new signal is received at the first receiver finger 112.

As the new signal is received, the receiver finger 112 detects pilot symbols in the new signal. The filter 300 averages successive pilot symbols to provide a weighted channel estimate. The filter 300 sums the pilot symbols, including the first pilot symbol and subsequent pilot symbols, and produces a sum in the accumulator 308. The weighted channel estimate is produced in response to the sum. The filter 300 may additionally divide the sum by a sample size, T, to produce the weighted channel estimate. The sample size T preferably corresponds to the size of the buffer, 42 pilot symbols or 21 combined pilot symbols, however other sample sizes may be used.

Thus, upon assigning the first receiver finger 112 to the new signal as locked, the filter 300 detects a first pilot symbol and forms a pilot symbol sum (consisting initially of only the first pilot symbol). A first pilot channel estimate is generated in response to the pilot symbol sum. The filter 300 may additionally divide the pilot symbol sum by T, where T is a predetermined value such as 21 or 42, to generate the first pilot channel estimate. The first receiver finger 112 demodulates a first traffic symbol according to the first traffic channel estimate. The first traffic symbol is combined by the combiner 118 with traffic symbols from the second receiver finger 114 and the third receiver finger 116, with no delay. The filter 300 continues, detecting a next pilot symbol. The filter 300 adds the next pilot symbol to the pilot symbol sum, generating a next channel estimate. The first receiver finger 112 demodulates a next traffic symbol according to the next channel estimate, detecting traffic symbols in the new signal. The combiner 118 combines the traffic symbols with traffic symbols from other receiver fingers, second receiver finger 114 and third receiver finger 116, according to the weighted channel estimate.

This process continues, weighting the channel estimates by the number of received pilot symbols, until the pilot symbol sum includes T pilot symbols. In this manner, the channel estimate improves as successive pilot symbols are received. The rough initial estimates have small magnitude since they are weighted by the small number of received pilot symbols. As a result, the inaccuracy of the estimate will not severely degrade performance of the receiver circuit. This implementation improves performance in situations where fingers are frequently re-assigned relative to other conventional methods, such as channel estimation using a PLL, in which a delay time is required to lock on to the new pilot.

Figure 4:
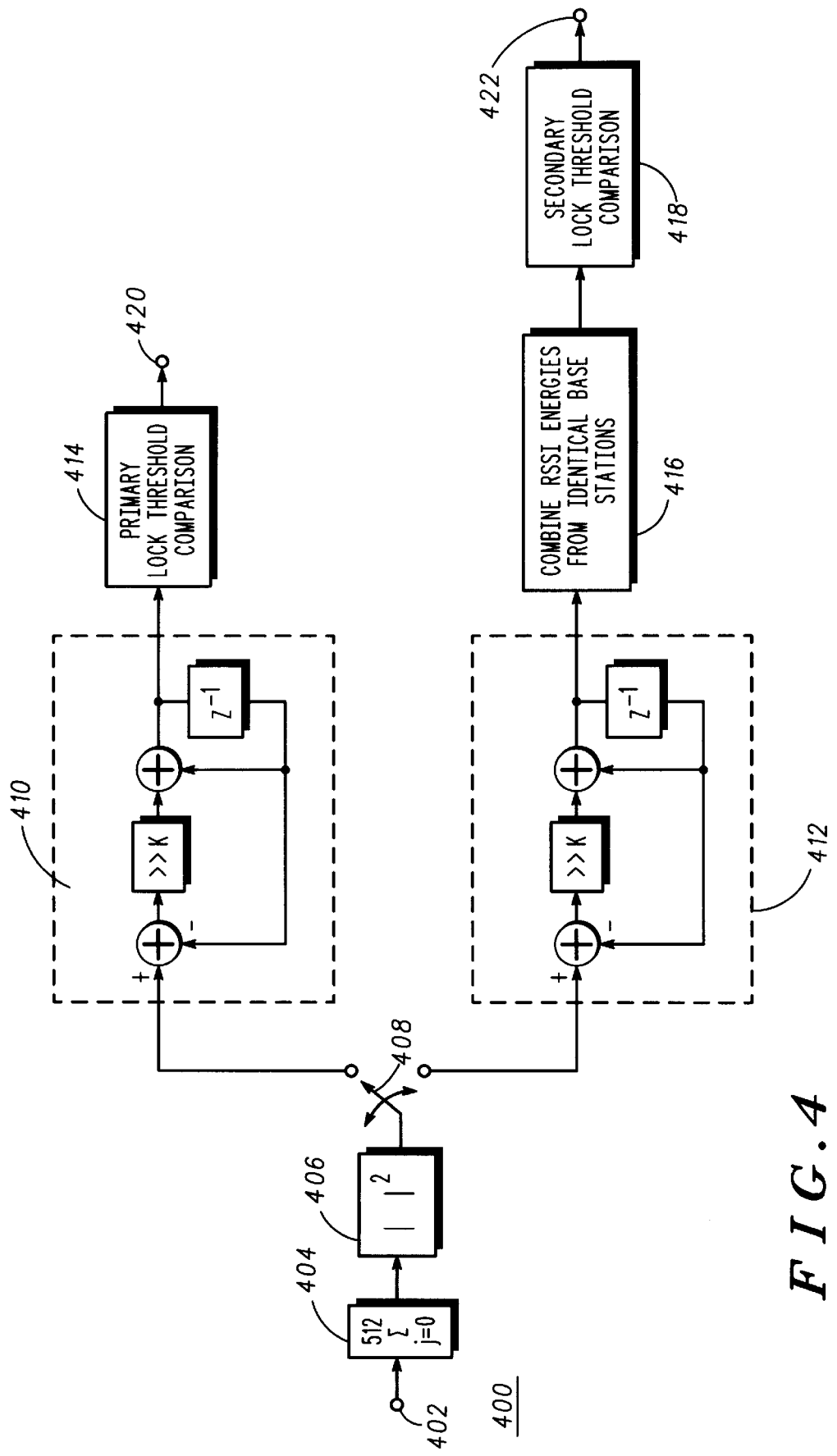
FIG. 4 is a block diagram of a received signal strength indicator circuit for use in the radiotelephone mobile station of FIG. 1.

Referring now to FIG. 4, it shows a received signal strength indication (RSSI) circuit 400 for use in the mobile station 100 of FIG. 1. The RSSI circuit 400 includes an input 402 for receiving pilot samples, a summer 404, an energy calculator 406, a switch 408, a first filter 410, a second filter 412, a first comparator 414, a preprocessor 416, a second comparator 418, a primary lock indicator output 420 and a secondary lock indicator output 422. It will be recognized by those ordinarily skilled in the art that any of the functions illustrated in FIG. 4 may be performed using software routines rather than the hardware elements illustrated.

The RSSI circuit 400 measures a received signal strength of received pilot symbols. Pilot symbols are formed by despreading the signal received at the input 402.

Good power control performance requires a fast RSSI circuit. The RSSI circuit should track Rayleigh fading and unlock a finger if a received signal momentarily drops into a fade. A weak link whose power control bits are demodulated incorrectly can cause the mobile station 100 to respond incorrectly to the power control indication. This can cause dropped calls and other undesirable conditions. Thus, for power control bit decoding, it is necessary that the RSSI circuit be fast enough to unlock any finger that drops into a deep fade for longer than, for example, 10 ms.

This requirement applies whether or not the mobile station 100 is in soft handoff. The requirement is more significant in soft handoff. In soft handoff, power control bits are decoded using a voting method. If any base station sends a power control indicator commanding the mobile station to decrease power, the mobile station will decrease power. If all power control indicators from all base stations in soft handoff indicate that the mobile station should increase power, the mobile station will increase power.

A locked finger contributes to both traffic channel demodulation and power control bit decoding. In a conventional receiver, the same lock indicator is used to control both the traffic channel combiner and power control bit demodulation. However, the rapid response to fading required for power control bit decoding is not required for traffic channel demodulation. Therefore, in accordance with the present invention, the RSSI circuit 400 is time-shared between providing a primary or traffic channel lock indication at a relatively slow speed and providing a secondary or power control lock indication at a relatively fast speed. Thus, in accordance with the present invention, each receiver finger of a rake receiver has two independent lock statuses, a primary lock status used for traffic channel decoding and a secondary lock status used for power control channel decoding. The mobile station 100 includes a traffic channel combiner such as combiner 118 and a power control bit decoder such as decoder 120. The primary lock status is used by the combiner 118 and the secondary lock status is used by the power control bit decoder of decoder 120.

Each of the rake receiver fingers 112, 114, 116 includes a pilot signal despreader 150 for despreading the pilot channel signal and a received signal strength indicator circuit such as RSSI circuit 400. In RSSI circuit 400, the input 402 is configured to receive pilot samples, for example from the pilot signal despreader 150 (FIG. 1). Pilot samples are provided to the summer 404. The summer 404 coherently adds a predetermined number of pilot samples, such as 512 successive pilot samples, to form a pilot symbol. The pilot symbols are provided to the energy calculator 406 for determining energy in the pilot signal.

The switch 408 generally couples the second filter 412 to the energy calculator 406 for each received pilot symbol. Once every M pilot symbols, the switch 408 also couples the first filter 410 to the energy calculator 406. M is a predetermined number of symbols, for example, eight symbols. Other values may be chosen for M as appropriate. Operation of the switch 408, which may be a part of a software routine, is controlled by the controller 122.

Structure and operation of the first filter 410 and the second filter 412 are similar to structure and operation of the filter 135 described above in conjunction with FIG. 1. The value of k is controlled by the controller 122. Typical values of k are integers in the range 3 to 6 inclusive. However, any suitable value may be used. The first filter 410 and the second filter 412 in the illustrated embodiment are each a one-pole infinite impulse response (IIR) filter. Other suitable filters may be used. The hardware elements which form the first filter 410 and the second filter 412 may be shared between the two filters. For example, two independent accumulators and two independent storage registers, one each for the primary or traffic channel lock indication and the secondary or power control lock indication, are preferably provided. This permits time sharing of other filter hardware between calculation of the two lock indication values or states.

The switch 408 couples the filter to one of two threshold comparison circuits. Position of the switch 408 is controlled by the controller 122. In accordance with the present invention, the RSSI circuit 400 forms a time shared lock indicator circuit which measures pilot energy and provides both a primary lock indication and a secondary lock indication. The primary lock indication corresponds to a long term average of pilot energy, associated with a smaller bandwidth IIR filter. The secondary lock indication corresponds to a short term average of pilot energy, associated with a larger bandwidth IIR filter.

In the illustrated embodiment, the switch 408 couples the second filter 412 with the energy calculator 406 for each received pilot symbol. This ensures that the secondary or power control lock indication can respond to rapid fades. In contrast, the switch 408 couples the first filter 410 with the energy calculator 406 only once every M received pilot symbols. In one embodiment, M=8. This ensures that the primary or traffic channel lock indicator corresponds to a long term average of pilot energy. Thus, the RSSI circuit 400 forms a time shared lock indicator circuit which provides the primary lock indication at a first rate and provides the secondary lock indication at a second rate, the second rate being faster then the first rate. The switch 408 forms a means for varying bandwidth of the RSSI circuit 400. Bandwidth may be varied by other means, such as a shift register, a decimator or by providing separate filters having different bandwidths.

The controller 122 controls the time shared lock indicator circuit. In an alternative embodiment, separate lock indicator circuits are provided for each of primary lock indication and the secondary lock indication. However, time sharing by using the switch 408 and under control of the controller 122 reduces the number of components required.

Interspersed with the traffic symbols is a power control channel comprising power control bits. The time relationship between receipt of the traffic channel and the power control channel is defined by the communication protocol used for communication between the mobile station 100 and remote base stations. For example, according to IS-95, power control bits are received every 1.25 ms.

The first comparator 414 compares the filtered signal with a first predetermined threshold. The first predetermined threshold is stored in the comparator 414 but is alternatively stored or calculated in any suitable manner. An exemplary value for the predetermined threshold is −20 dB Ec/Io. The first comparator 414 provides the primary lock indication in a first state when the received signal strength exceeds the first predetermined threshold and in a second state when the received signal strength does not exceed the first predetermined threshold. The first comparator 414 thus generates a primary lock indication in response to a long-term average of the pilot signal energy. The primary lock indication is provided by the first comparator 414 at the primary lock indicator output 420. The primary lock indicator output 420 is coupled to the controller 122 (FIG. 1).

The preprocessor 416 receives the filtered signal from the filter 410. The preprocessor 416 combines RSSI energies from multipath rays received from identical base stations. This allows the second comparator 418 to make its lock/unlock decision based on the total RSSI from a particular base station, rather than on the individual finger's RSSI. Combining the RSSI energies in this manner helps to minimize error in power control bit decoding. The second comparator 418 provides the secondary lock indication when the preprocessor 416 output exceeds a second predetermined threshold. The second comparator 418 periodically detects a received signal strength of the received pilot signal and provides the secondary lock indication in a first state when the received signal strength exceeds a second predetermined threshold, stored at the second comparator 418 or elsewhere, and in a second state when the received signal strength does not exceed the second predetermined threshold. An exemplary value for the second predetermined threshold is −17 dB Ec/Io. The second comparator 418 thus generates a secondary lock indication in response to the short-term average of the pilot signal energy. The secondary lock indication is provided by the second comparator to the secondary lock indication output 422. The secondary lock indication output 422 is coupled to the controller 122.

In accordance with the present invention, the controller 122 controls finger lock status in response to the primary lock status and the secondary lock status as indicated by the primary lock indication and the secondary lock indication. The controller 122 includes a receiver finger of the plurality of receiver fingers 112, 114, 116 for contributing to the traffic channel combiner 118 when the primary lock indication for that receiver finger is produced. The controller excludes the receiver finger from contributing to the traffic channel combiner 118 when the primary lock indication is not produced. The controller 122 includes the receiver finger for contributing to the power control bit decoder 120 when the secondary lock indication is produced. The controller 122 also excludes the receiver finger from contributing to the traffic channel combiner 118 when the secondary lock indication is not produced.

Further in accordance with the present invention, the RSSI circuit 400 forms a signal quality detection circuit having a variable bandwidth, including a first bandwidth for detecting the traffic channel and a second bandwidth for detecting the power control channel. The first bandwidth is maintained by operating on every 1/M received pilot symbol. The second bandwidth is established by operating on every received symbol. The bandwidth is variable in response to control signals received from the controller 122.

The inventor has determined that significant improvement can be made to power control bit decoding performance in an IS-95 system by using a relatively fast RSSI circuit for the secondary lock indication. The RSSI circuit 400 shown in FIG. 4 can achieve this improvement by using the following exemplary configuration: setting M=1, k=3 in the second filter 412 and second predetermined threshold=−17 dB Ec/Io. Other suitable values may be used. With these settings, the time constant of the circuit is substantially 3 ms, and the circuit will track rapid fading and unlock fingers whose Ec/Io falls below −17 dB Ec/Io. It is not important to make the RSSI circuit 400 any faster than 3 ms since the power control bits are received at the mobile station 100 only once every 1.25 ms.

Although increasing the speed of the RSSI circuit will improve the power control performance, it will degrade the traffic channel performance. For optimal traffic channel decoding, a slow RSSI circuit with a low unlock threshold gives best performance. The RSSI circuit 400 in FIG. 4 can achieve this performance by using the following exemplary configuration: setting M=8, k=6 in the first filter 410 and first predetermined threshold =−20 dB Ec/I. Other suitable values may be used. With these settings, the time constant of the circuit is 200 ms.

The controller 122 varies the bandwidth of the RSSI circuit 400 for traffic channel and power control channel detection. As an option, the first bandwidth, corresponding to traffic channel detection, may be adjusted using the shift register value k. For the first filter 410, k=3 corresponds to a bandwidth of 6 Hz, k=4 corresponds to a bandwidth of 3 Hz, k=5 corresponds to a bandwidth of 1.5 Hz and k=6 corresponds to a bandwidth of 0.75 Hz. For the power control channel, k=3 in the second filter 412 corresponds to a bandwidth of 48 Hz, k=4 corresponds to a bandwidth of 24 Hz, k=5 corresponds to a bandwidth of 12 Hz and k=6 corresponds to a bandwidth of 6 Hz.

In environments where pilot signals are changing rapidly and fingers are often being reassigned, the method and apparatus according to the present invention offers an additional feature. The bandwidth k in the first filter 410 can be adjustable over the range from 3 to 6. Thus, when fingers are assigned, the finger can be assigned with k=3 and with the primary lock indicator being locked. This means that the finger can immediately be used for traffic channel combining, with no delay between finger assignments. Once the receiver finger's RSSI has reached steady state, k should be switched back to 6 for a longer averaging period.

As can be seen from the foregoing, the present invention provides a method and apparatus for improving performance of a mobile station in a spread spectrum communication system. Two separate lock indicators are provided, one for the traffic channel decoder and one for the power control channel decoder. The power control lock indicator is generated with the larger bandwidth RSSI circuit and the traffic channel lock indicator is generated with the smaller bandwidth RSSI circuit. This allows performance to be tailored to the individual requirements of the traffic channel decoding and the power control channel decoding. This, in turn, allows the performance to be optimized for accurate demodulation of both power control bits and traffic bits. The RSSI circuit is time-shared between the traffic channel and power control channel to minimize hardware requirements.

While a particular embodiment of the present invention has been shown and described, modifications may be made. It is therefore intended in the appended claims to cover all such changes and modifications which fall within the true spirit and scope of the invention.

What is claimed is:

1. A communication device, comprising:
   a pilot signal despreader;
   a traffic channel combiner;
   a power control bit decoder;
   a time shared lock indicator circuit coupled to the traffic channel combiner and the power control bit decoder, the time shared lock indicator circuit detecting pilot symbols and providing a primary lock indication for use by the traffic channel combiner and detecting pilot symbols and providing a secondary lock indication for use by the power control bit decoder; and a controller for controlling the time shared lock indicator circuit.

2. A communication device as recited in claim 1 wherein the time shared lock indicator circuit provides the primary lock indication at a first rate and provides the secondary lock indication at a second rate, the second rate being faster than the first rate.

3. A communication device as recited in claim 1 further comprising a plurality of receiver fingers for detecting traffic symbols and power control symbols, each of the plurality of receiver fingers including an associated time shared lock indicator circuit, the traffic channel combiner being coupled to the plurality of receiver fingers for combining traffic symbols from respective receiver fingers in response to a respective primary lock indication received from each respective receiver finger, the power control bit decoder being coupled to the plurality of receiver fingers for decoding power control bits from respective receiver fingers in response to a respective secondary lock indication received from each respective receiver finger.

4. A communication device as recited in claim 3 wherein the time shared lock indicator circuit provides the primary lock indication when a long-term average measurement of pilot signal energy exceeds a first predetermined threshold and the time shared lock indicator circuit provides the secondary lock indication when a short-term average measurement of pilot signal energy exceeds a second predetermined threshold.

5. A communication device comprising:
- a plurality of receiver fingers configured for receiving a spread spectrum communication signal including a pilot channel signal, each receiver finger including:
  - a pilot symbol despreader for despreading the pilot channel signal and detecting pilot symbols;
  - a received signal strength indication circuit coupled to the pilot symbol despreader, the received signal strength indication circuit having a variable bandwidth including a first bandwidth and a second bandwidth, the first bandwidth being less than the second bandwidth, the received signal strength indication circuit producing a primary lock indication when a received signal quality exceeds a first predetermined threshold at the first bandwidth and producing a secondary lock indication when the received signal quality exceeds a second predetermined threshold at the second bandwidth; and
- a controller coupled to the plurality of receiver fingers for controlling lock status of the plurality of receiver fingers in response to the primary lock indication and the secondary lock indication.

6. A communication device as recited in claim 5 further comprising a combiner coupled to the plurality of receiver fingers, the combiner combining a traffic signal from each respective assigned receiver finger in response to the primary lock indication from each respective assigned receiver finger.

* * * * *